United States Patent
Traulsen et al.

(10) Patent No.: US 8,530,066 B2
(45) Date of Patent: Sep. 10, 2013

(54) FEEDTHROUGH FOR BATTERY, METHOD FOR MANUFACTURING SAME AND THE BATTERY

(75) Inventors: Tim Traulsen, Pirna (DE); Jens-Peter Mueller, Dresden (DE)

(73) Assignee: Biotronik CRM Patent AG, Baar (CH)

( * ) Notice: Subject to any disclaimer, the term of this patent is extended or adjusted under 35 U.S.C. 154(b) by 882 days.

(21) Appl. No.: 12/336,765

(22) Filed: Dec. 17, 2008

(65) Prior Publication Data

US 2009/0181289 A1   Jul. 16, 2009

(30) Foreign Application Priority Data

Jan. 15, 2008   (DE) .......................... 10 2008 004 308

(51) Int. Cl.
*H01M 2/00* (2006.01)
(52) U.S. Cl.
USPC ............................................. 429/65; 429/185
(58) Field of Classification Search
USPC ........................................ 429/65, 233; 33/65
See application file for complete search history.

(56) References Cited

U.S. PATENT DOCUMENTS

| | | | |
|---|---|---|---|
| 4,163,828 A * | 8/1979 | Mahoney | 428/523 |
| 4,352,951 A | 10/1982 | Kyle | |
| 4,598,466 A * | 7/1986 | Arenas et al. | 29/623.2 |
| 4,659,378 A | 4/1987 | Volz et al. | |
| 4,816,621 A | 3/1989 | Huebner et al. | |
| 5,406,444 A | 4/1995 | Selfried et al. | |
| 5,679,026 A | 10/1997 | Fain et al. | |
| 5,759,197 A | 6/1998 | Sawchuk et al. | |
| 5,821,011 A | 10/1998 | Taylor et al. | |
| 5,942,842 A | 8/1999 | Fogle, Jr. | |
| 5,951,595 A | 9/1999 | Moberg et al. | |
| 6,044,302 A | 3/2000 | Persuitti et al. | |
| 6,428,368 B1 | 8/2002 | Hawkins et al. | |
| 6,459,935 B1 | 10/2002 | Piersma | |
| 6,519,133 B1 | 2/2003 | Eck et al. | |
| 6,529,103 B1 | 3/2003 | Brendel et al. | |
| 6,566,978 B2 | 5/2003 | Stevenson et al. | |
| 6,567,259 B2 | 5/2003 | Stevenson et al. | |
| 6,643,903 B2 | 11/2003 | Stevenson et al. | |

(Continued)

FOREIGN PATENT DOCUMENTS

| | | |
|---|---|---|
| DE | 195 44 198 | 4/1997 |
| DE | 10 2005 007 179 | 8/2006 |

(Continued)

OTHER PUBLICATIONS

English Machine Translation of JP 2001266813 A to Suzuki et al.*

(Continued)

*Primary Examiner* — Patrick Ryan
*Assistant Examiner* — Lucas J. O'Donnell
(74) *Attorney, Agent, or Firm* — ARC IP Law, PC; Joseph J. Mayo

(57) ABSTRACT

A feedthrough for a battery having a first terminal element (1) and a second terminal element (2), which are at different electric potentials. The first terminal element (1) and/or the second terminal element (2) has (have) have a coating (3) which is produced by chemical vapor deposition and which prevents a short circuit between the first terminal element (1) and the second terminal element (2). Furthermore, a simple and inexpensive method for manufacturing such a coating is provided. The invention also relates to a battery having at least one such feedthrough.

13 Claims, 4 Drawing Sheets

(56) References Cited

U.S. PATENT DOCUMENTS

| | | |
|---|---|---|
| 6,765,779 B2 | 7/2004 | Stevenson et al. |
| 6,765,780 B2 | 7/2004 | Brendel et al. |
| 6,768,629 B1 | 7/2004 | Allen |
| 6,822,845 B2 | 11/2004 | Chereson |
| 6,852,925 B2 | 2/2005 | Wof et al. |
| 6,882,248 B2 | 4/2005 | Stevenson et al. |
| 6,934,582 B2 | 8/2005 | Thong et al. |
| 6,987,660 B2 | 1/2006 | Stevenson et al. |
| 6,999,818 B2 | 2/2006 | Stevenson et al. |
| 7,274,963 B2 | 9/2007 | Spadgenske |
| 7,564,674 B2 | 7/2009 | Frysz |
| 7,812,691 B1 | 10/2010 | Fisk |
| 7,930,032 B2 | 4/2011 | Teske |
| 2002/0027484 A1 | 3/2002 | Stevenson et al. |
| 2002/0162965 A1* | 11/2002 | Okada et al. ............ 250/370.11 |
| 2003/0139096 A1 | 7/2003 | Stevenson et al. |
| 2004/0007748 A1 | 1/2004 | Sakama et al. |
| 2004/0012462 A1 | 1/2004 | Kim |
| 2004/0049909 A1 | 3/2004 | Salot et al. |
| 2004/0078062 A1 | 4/2004 | Spadgenske |
| 2004/0116976 A1 | 6/2004 | Spadgenske |
| 2004/0185310 A1 | 9/2004 | Jenson |
| 2004/0191621 A1* | 9/2004 | Heller, Jr. .................... 429/181 |
| 2004/0209163 A1 | 10/2004 | Watanabe |
| 2004/0215280 A1 | 10/2004 | Dublin et al. |
| 2007/0117821 A1* | 5/2007 | Ding et al. .................... 514/275 |
| 2007/0172735 A1 | 7/2007 | Hall et al. |
| 2008/0314865 A1 | 12/2008 | Ok et al. |

FOREIGN PATENT DOCUMENTS

| | | | |
|---|---|---|---|
| GB | 2127629 | | 4/1984 |
| JP | 2001266813 | | 9/2001 |
| JP | 2001266813 A | * | 9/2001 |
| JP | 2008140705 | | 6/2008 |
| WO | 2007/145392 | | 12/2007 |

OTHER PUBLICATIONS

German Search Report, dated Aug. 28, 2008, 2 pages.
European Search Report, dated Mar. 11, 2009, 11 pages.
German Search Report issued for DE Application No. 10 2006 041 940.5, dated May 10, 2007, 3 pages.
European Search Report issued for EP Application No. 07015670.8, dated Apr. 4, 2011, 5 pages.

* cited by examiner

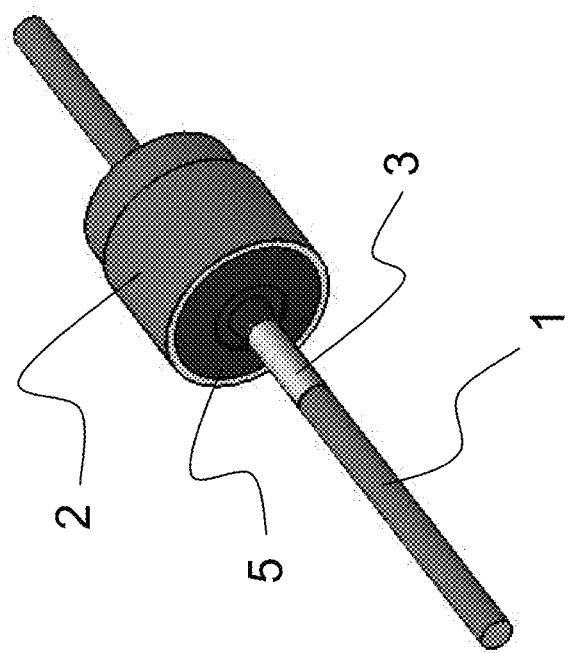

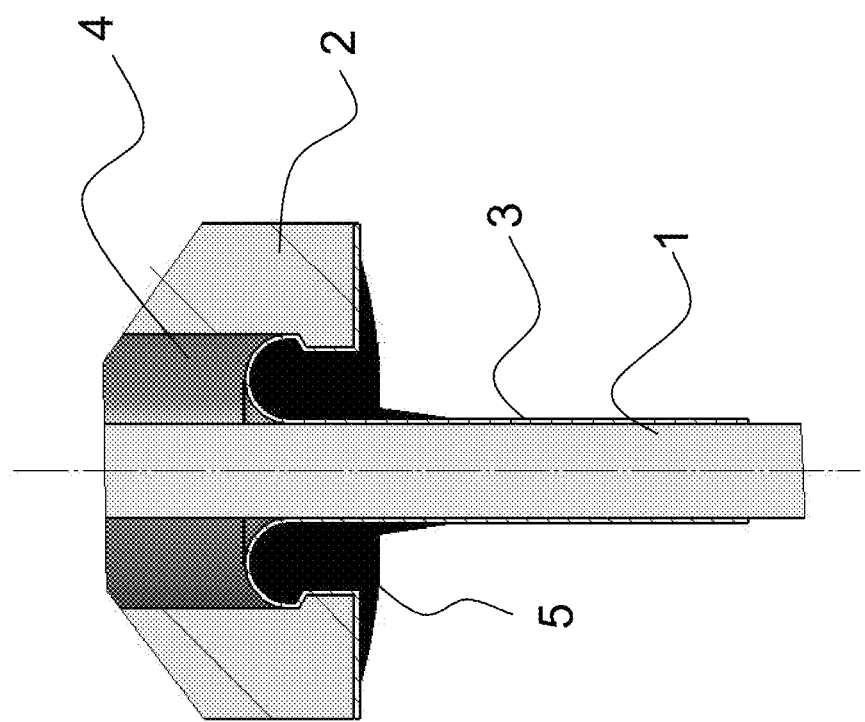

FEEDTHROUGH FOR BATTERY, METHOD FOR MANUFACTURING SAME AND THE BATTERY

This application takes priority from German Patent Application DE 10 2008 004 308.7, filed 15 Jan. 2008, the specification of which is hereby incorporated herein by reference.

BACKGROUND OF THE INVENTION

1. Field of the Invention

Embodiments of the invention relate to a feedthrough for a battery having a first terminal element and a second terminal element, which are at different electric potentials. Furthermore, embodiments of the invention relate to a method for manufacturing such a feedthrough and a battery having such a feedthrough.

2. Description of the Related Art

Glass-metal feedthroughs or ceramic feedthroughs are used in hermetically sealed batteries, such as those used in medical implants, ensuring an airtight electrically insulated feedthrough of a battery pole through the metallic housing. Such a feedthrough has a first terminal element in the form of a pin and a second terminal element in the form of a flange element, the two being at different electric potentials (positive pole, negative pole). Because of the slight distance between the metallic pin and the metallic flange element, even small amounts of electrically conductive material in the inner area of the feedthrough are sufficient to create a short circuit of the battery.

Such conductive materials, which create a short circuit, may be formed by dissolving the electrode materials in the electrolyte inside the battery due to the potential differences prevailing there. In the case of lithium batteries, for example, lithium may under certain conditions go into solution in the form of lithium cations. These lithium cations may be deposited in the form of elemental lithium on battery components having an anodic potential. With known batteries, to prevent short circuits in batteries due to such lithium deposits, critical components inside the battery are insulated. For example, an electrically insulating layer prevents electrons from being transferred to the ions of the electrolyte. This prevents deposits. Furthermore, deposition of metal is prevented by suppressing the wetting of the electrolyte by electrically conductive components.

In traditional batteries, glass-metal feedthroughs or ceramic feedthroughs are sealed on the inside of the battery to avoid the problems discussed above. The seal is usually provided by casting them in a polymer resin or by using a polymer plug, which is pushed onto the pin of the feedthrough. However, this procedure is very difficult to implement in the case of very small feedthroughs. Furthermore, with a small distance between the flange element and the pin, only casting materials having a very low viscosity are suitable, so the choice of casting materials is limited. This choice is additionally limited by the fact that these materials must not contain any constituents that are soluble in the electrolyte to prevent the electrolyte from damaging the casting material. The technical implementation of casting is also made difficult by the fact that the casting must be accomplished without forming pores or cavities. When using polymer plugs, there is the problem that they are usually very difficult to seal completely with respect to the pin and flange element.

BRIEF SUMMARY OF THE INVENTION

An object of embodiments of the invention include creating a feedthrough which effectively prevents an electric short circuit between the pin and the flange element, especially over a long lifetime of the battery. Another object is to create a corresponding battery. The object additionally includes providing a simple and inexpensive method for manufacturing such a feedthrough.

The object defined above is achieved by a feedthrough having a coating that is produced by means of chemical vapor deposition (CVD) and prevents a short circuit between the first terminal element and the second terminal element on the first terminal element and/or on the second terminal element.

The term "chemical vapor deposition" (CVD) is understood to refer to a method in which a solid component is deposited from the vapor phase on the heated surface of a substrate because of a chemical reaction. To do so, there must be volatile compounds of the components of the layer, which deposit the solid layer at a certain reaction temperature. This chemical vapor deposition process is characterized by at least one reaction at the surface of the workpiece to be coated. At least two gaseous starting compounds (educts) and at least two reaction products—including at least one gaseous product and at least one in the solid phase—must be involved in this reaction. Chemical vapor deposition allows pore-free coating of complex surfaces having a three-dimensional structure. In this way, extremely fine recesses or hollow bodies can be coated uniformly on their inside, for example, so this effectively prevents a short circuit between the first terminal element and the second terminal element. Because the coating is free of pores, this acts as an electric boundary layer as well as forming a mechanical boundary layer between the metallic components and the electrolyte. Since coating takes place at room temperature in vacuo, the procedure in coating is not exposed to any temperature stress so the enamel or ceramic is not damaged. Another advantage of applying an insulating coating by CVD is that parts of the components of the feedthrough which are not to be coated may be covered. In the present case this pertains to, for example, the lateral surface of the second terminal element in the form of a flange element because the flange is welded to the lateral surface when using the feedthrough in a battery, for example, and therefore must not have a coating.

A conforming, i.e., homogeneous CVD layer deposition that creates a closed layer is especially preferably used.

In one exemplary embodiment, the coating produced in this way contains the compound parylene; the coating may be constructed entirely of parylene. Such a coating has very good adhesion properties. This is true in particular of the typical materials that are used in a feedthrough (for example, stainless steel or molybdenum as the first terminal element material and stainless steel or titanium as the second terminal element material). Furthermore, parylene is chemically inert with regard to the components of typical battery electrolytes, so the coating neither dissolves nor swells. This ensures that no components of the coating enter the electrolyte. The parylene coating also has a high thermal stability.

The parylene that is preferably used in chemical vapor deposition is also characterized in that parylene has a hydrophobic, chemically resistant coating that forms an excellent barrier with respect to organic and inorganic media, strong acids, bases, gases and water vapor. Furthermore, parylene has an excellent electric insulation layer with a high dielectric strength and a low dielectric constant. Furthermore, the coating is biostable and biocompatible and is approved by the FDA. In a layer thickness greater than approx. 0.2 µm, the parylene layer can be produced without micropores or pinholes by means of chemical vapor deposition. A thin transparent coating of parylene having a high crack mobility that is suitable for substrates with a complex structure or edges can be produced by CVD. The coating can be produced by CVD without any thermal burden on the substrate since it is performed at room temperature in vacuo. The parylene coating also provides protection against corrosion. Furthermore, an absolutely uniform layer can be formed by CVD. The coating also has thermal stability up to 200° C. and is mechanically stable in the range from approx. −200° C. to approx. +150° C. The parylene coating causes low mechanical stresses, is abrasion-resistant, does not outgas and has a high dielectric strength.

In a preferred embodiment, the thickness of the coating amounts to approx. 1 μm to approx. 100 μm, especially preferably between approx. 3 μm and approx. 40 μm. This thickness has the advantage that a closed pore-free layer is formed but there is not yet any cracking due to stresses within the coating.

In an exemplary embodiment described below, the coating is applied to an area of the lateral surface of the first terminal element in the form of a pin which protrudes out of the second terminal element in the form of a flange element on the battery side, the battery-side end face of the second terminal element and the battery-side end face of the fused glass arranged between the first terminal element and the second terminal element. The coating here completely covers the respective section of the lateral surface of the pin as well as the respective end faces of the fused glass and the flange element, so that there is a cohesive coating area extending over these three elements of the feedthrough. The coated area of the lateral surface of the pin is connected directly to the fused glass on the battery end. Through this preferred arrangement of the coating, an especially effective seal of the first terminal element and the second terminal element with respect to the electrolyte and electric insulation of the first terminal element and the second terminal element are achieved in a simple manner.

In another exemplary embodiment, a silicone casting is at least partially provided on the surface of the coating. This casting assumes an additional sealing function.

The object defined above is also achieved by a battery having at least one inventive feedthrough as described above. Such a battery has the advantage that it has a very long lifetime and that short circuits in the current-carrying components are effectively prevented.

The object defined above is also achieved by a method for manufacturing a feedthrough in which first the feedthrough is provided with a first terminal element and a second terminal element that is mechanically connected to the first terminal element, and then a coating which preferably contains parylene and prevents a short circuit between the second terminal element and the first terminal element is applied by means of chemical vapor deposition (CVD) to the first and/or second terminal element(s). Applying the coating by means of CVD has the advantages mentioned above.

It is also preferable to use plasma-enhanced chemical vapor deposition (PECVD). Thanks to PECVD, the temperature burden on the substrate can be reduced because a high-frequency plasma is ignited above the substrate, exciting the gas introduced into the space. This makes it possible to reduce the reaction energy and thus allows a lower process temperature. Coating may therefore be performed at room temperature.

In conjunction with the present invention, the plasma is preferably generated capacitively by electromagnetic fields or by microwave radiation. To produce a capacitively generated plasma, a sufficiently strong alternating electric field is usually applied to two plates between which the plasma develops. In the plasma, charged particles oscillate back and forth at the frequency of the alternating field. In excitation of the plasma by microwave radiation, it is passed through a magnetron into the reaction space. To ignite the plasma, the field strength of the electromagnetic wave must first be high enough to induce an electric breakdown and collision ionization. After the plasma has been ignited, the magnetron adapts to the altered field strength conditions and impedance conditions prevailing then. Other possibilities of generating the plasma consist of thermal excitation by chemical reactions, radiation excitation by laser radiation, excitation by d.c. voltage and excitation by electromagnetic fields via an inductive (magnetic) device.

The chemical vapor deposition is especially preferably performed at a pressure of approx. 0.5 hPa to approx. 0.01 hPa, preferably at approx. 0.1 hPa.

In an especially preferred exemplary embodiment, after the CVD or PECVD coating, a plasma aftertreatment of the applied layer may be performed, leading to activation of the surface of the coating. This activated surface forms the basis for additional safety measures for the feedthrough. For example, a feedthrough coated in this way may subsequently be cast with silicone resin. In this way, several safety measures may be used in parallel so that the safety of the batteries, in particular in sensitive applications such as in medical technology, is additionally increased.

In another preferred exemplary embodiment, the components, in particular the first terminal element and/or the second terminal element are subjected to an ultrafine plasma cleaning before the coating, in which all the organic impurities on the surface of the feedthrough are removed by oxidation in a plasma in the presence of oxygen. Surfaces that have been highly purified in this way produce optimal adhesion of the coating to the substrate. Such a cleaning stabilizes the reproducibility of the coating process.

In another exemplary embodiment, after the plasma aftertreatment or after the coating process, the coating is cast in a silicone resin.

BRIEF DESCRIPTION OF THE DRAWINGS

Additional goals, features, advantages and possible applications of the invention are derived from the following description of an exemplary embodiment on the basis of the figures. All the features described and/or illustrated graphically here may form the subject matter of the present invention, either alone or in any combination, independently of how they are combined in the individual claims here or their references back to previous claims.

In the schematic diagrams:

FIG. 3 shows a perspective view of a second exemplary embodiment of an inventive feedthrough as seen from the side and FIG. 4 shows the battery end of a cross section of the inventive feedthrough according to FIG. 3.

DETAILED DESCRIPTION OF THE INVENTION

Figure 1:
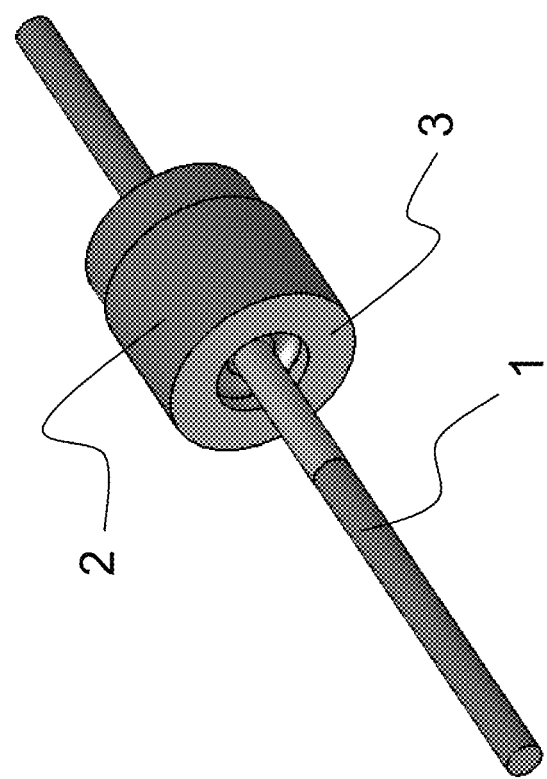
FIG. 1 shows a prospective view of a first exemplary embodiment of an inventive feedthrough as seen from the side and FIG. 2 shows the battery end of a cross section of the inventive feedthrough according to FIG. 1.
Figure 2:
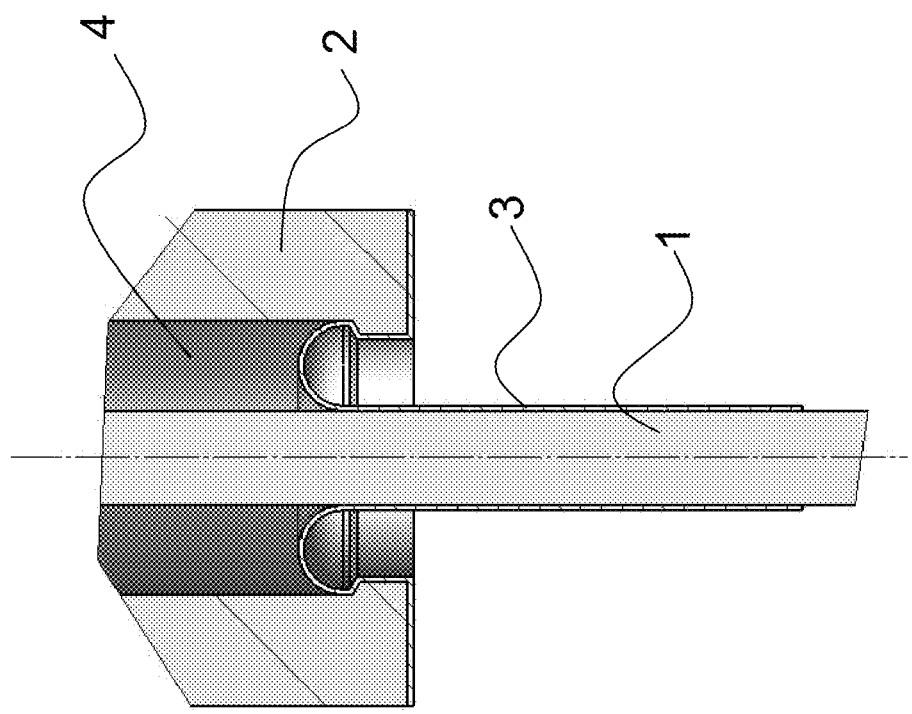

The glass-metal feedthrough illustrated in FIGS. 1 and 2 has a cylindrical pin 1 as the first terminal element and a hollow cylindrical flange element 2 which surrounds the pin 1 and serves as the second terminal element. The pin 1 is arranged concentrically in the central opening of the flange element 2, with a fused glass 4 being provided between the pin 1 and flange element 2. The fused glass 4 is arranged in the opening of the flange element 2 in such a way that it is set back slightly from the battery-side end face of the flange element 2. The battery-side end face of the flange element 2 and the battery-side end face of the fused glass 4 as well as an area of the lateral surface of the pin 1 protruding out of the fused glass 4 on the battery side are provided with a CVD coating 3 consisting of parylene. The pin 1 forms the positive pole in the feedthrough and the flange element 2 forms the negative pole.

The parylene coating is created by chemical vapor deposition. The starting material is di-para-xylylene or its halogenated substituents, which form compounds that are stable at room temperature. The starting material is vaporized and passed through a high-temperature zone, where a highly reactive monomer, a so-called para-xylylene diradical, is formed and immediately reacts on the surface of the feedthrough to be coated, forming a chain-type polymer.

FIGS. 3 and 4 illustrate another exemplary embodiment of the present invention, in which a portion of the battery-side end face of the flange element 2 and the battery-side end face of the fused glass 4 and also an area of the lateral surface of the pin 1 protruding out of the fused glass 4 on the battery end are provided with a silicone casting 5. The casting 5 is preferably applied to the coating 3 and extends over only a portion of the surface of pin 1, flange element 2 and fused glass 4 which are provided with the parylene coating 3. The cast silicone 5 may be of a silicone resin.

LIST OF REFERENCE NUMERALS

1 pin
2 flange element, flange
3 coating of parylene
4 fused glass
5 silicone casting

What is claimed is:

1. A method for manufacturing a feedthrough for a battery comprising a first terminal element (1) and a second terminal element (2) that are electrically insulated from one another, wherein the first terminal element and/or the second terminal element comprises a parylene coating (3) which prevents a short circuit between the first and second terminal elements (1, 2) comprising:

mechanically coupling the first terminal element (1) and the second terminal element (2) to one another via fused glass wherein said second terminal surrounds said first terminal and wherein said first terminal passes through said fused glass via an opening in said second terminal; and, applying the parylene coating (3) by chemical vapor deposition on the first terminal element (1) and/or the second terminal element (2);

wherein applying the parylene coating comprises vaporizing a starting material in a high-temperature zone, wherein the starting material comprises di-para-xylylene or di-para-xylylene halogenated substituents; and forming a para-xylylene diradical which immediately reacts on a surface of the feedthrough to form a chain-type polymer;

making a casting of the feedthrough by silicone resin after the plasma aftertreatment of the coating (3) or the creating of the coating;

wherein the silicone resin casting is applied to the coating and extends over a portion of the first terminal element, the second terminal element and the fused glass forming an inner lip between the fused glass and the second terminal element.

2. The method according to claim 1, wherein said applying the coating (3) comprises creating the coating by plasma-enhanced chemical vapor deposition (PECVD).

3. The method according to claim 1, further comprising performing the chemical vapor deposition at approximately 0.5 hPa to approximately 0.01 hPa.

4. The method according to claim 1, further comprising performing the chemical vapor deposition at approximately 0.1 hPa.

5. The method according to claim 1, further comprising performing an ultrafine plasma cleaning of the first terminal element (1) and/or the second terminal element (2) before the creating of the coating.

6. The method according to claim 1, further comprising subjecting the coating (3) to a plasma aftertreatment.

7. The method according to claim 6, wherein the silicone resin casting extends into the second terminal element and into the fused glass such that the silicone resin casting is at least partially encapsulated by the second terminal element and the fused glass.

8. The method according to claim 1, wherein said applying said coating (3) comprises applying said coating of a thickness of between approximately 1 µm and approximately 100 µm.

9. The method according to claim 1, wherein said applying said coating (3) comprises applying said coating of a thickness of between approximately 3 µm and approximately 40 µm.

10. The method according to claim 1, further comprising using a pin (1) as the first terminal element and using a flange element (2) as the second terminal element and wherein said applying said coating (3) comprises applying said coating on an area of a lateral surface of the pin (1) which protrudes out of the flange element (2) on a battery-side of the feedthrough, applying said coating on a battery-side end face of the flange element (2), and applying said coating on a battery-side end face of the fused glass (4).

11. The method according to claim 1, further comprising applying a silicone casting (5) at least partially on a surface of the coating (3).

12. The method according to claim 1 further comprising coupling said first terminal element with a battery.

13. A method for manufacturing a feedthrough for a battery comprising a first terminal element (1) and a second terminal element (2) that are electrically insulated from one another, wherein the first terminal element and/or the second terminal element comprises a coating (3) which prevents a short circuit between the first and second terminal elements (1, 2) comprising:

mechanically coupling the first terminal element (1) and the second terminal element (2) to one another via fused glass wherein said second terminal surrounds said first terminal and wherein said first terminal passes through said fused glass via an opening in said second terminal;

applying the coating (3) by chemical vapor deposition on the first terminal element (1) and/or the second terminal element (2) wherein the coating comprises parylene;

wherein applying the parylene comprises vaporizing a starting material in a high-temperature zone, wherein the starting material comprises di-para-xylylene or di-para-xylylene halogenated substituents; and forming a para-xylylene diradical which immediately reacts on a surface of the feedthrough to form a chain-type polymer;

subjecting the coating (3) to a plasma aftertreatment; and, making a casting of the feedthrough by silicone resin after the plasma aftertreatment of the coating (3) or the creating of the coating;

wherein the silicone resin casting is applied to the coating and extends over a portion of the first terminal element, the second terminal element and the fused glass forming an inner lip between the fused glass and the second terminal element; and wherein the silicone resin casting extends into the second terminal element and into the fused glass such that the silicone resin casting is at least partially encapsulated by the second terminal element and the fused glass.

* * * * *